United States Patent
Quadros et al.

(10) Patent No.: US 10,013,340 B1
(45) Date of Patent: Jul. 3, 2018

(54) TESTING IN VIRTUALIZED COMPUTING ENVIRONMENTS

(71) Applicant: Amazon Technologies, Inc., Seattle, WA (US)

(72) Inventors: Kevin Lester Quadros, Redmond, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/084,434

(22) Filed: Mar. 29, 2016

(51) Int. Cl.
  G06F 9/44 (2018.01)
  G06F 11/36 (2006.01)

(52) U.S. Cl.
  CPC ................. *G06F 11/3688* (2013.01)

(58) Field of Classification Search
  None
  See application file for complete search history.

(56) References Cited

U.S. PATENT DOCUMENTS

| | | | |
|---|---|---|---|
| 2003/0110421 A1* | 6/2003 | Kurinami | G06F 11/3428 714/47.1 |
| 2013/0152047 A1 | 6/2013 | Moorthi et al. | |
| 2015/0006966 A1 | 1/2015 | Dimitrovich et al. | |
| 2015/0339216 A1 | 11/2015 | Wade | |
| 2016/0140022 A1 | 5/2016 | Michelsen | |

OTHER PUBLICATIONS

Ljubomir Lazic, Snezana Popovic, Nikos E. Mastorakis, A Simultaneous Application of Combinatorial Testing and Virtualization as a Method for Software Testing, WSEAS Transactions on Information Science and Applications, Nov. 2009, pp. 1802-1813, vol. 6, Issue 11.

Lian Yu, Wei-Tek Tsai, Xiangji Chen, Linqing Liu, Yan Zhao, Liangjie Tang, Wei Zhao, Testing as a Service over Cloud, 2010 Fifth IEEE International Symposium on Service Oriented System Engineering, Jun. 2010, pp. 181-188, China.

Alberto N'u-Nez Robert M. Hierons, A methodology for validating cloud models using metamorphic testing, annals of telecommunications—annales des télécommunications, Jul. 4, 2014, pp. 127-135, Institut Mines-Tlcom and Springer-Verlag, France.

* cited by examiner

*Primary Examiner* — Qamrun Nahar

(74) *Attorney, Agent, or Firm* — Thorpe North & Western, LLP.

(57) ABSTRACT

Technology is described for selecting parameter combinations corresponding to virtual instance configurations to be tested in a virtual computing environment and for performing tests in a plurality of parallel test pipelines. Throttling constraints can be applied so that resources used by the test pipelines in the testing process do not exceed predefined limits.

20 Claims, 7 Drawing Sheets

TESTING IN VIRTUALIZED COMPUTING ENVIRONMENTS

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

A virtualized computing environment may be made available to a customer (e.g., a person or a business) through a service provider that provides virtualization technologies for computing resources. The customer may have a customer account with the service provider and may have a customer environment associated with the customer account. The customer (e.g., the customer's agents, who may have multiple sub-accounts associated with the customer account) may be able to create, organize, and modify the customer environment to meet the customer's needs. The customer may, for example, launch virtual computing resources (e.g., computing instances, data store instances, other virtualized objects, or applications) within the customer environment. These virtual computing resources may interact with one another within the virtualized service provider environment in various ways depending on how the service provider environment is designed. The customer may also wish to perform tests to verify that certain configurations, modifications, patches, or bug fixes will properly supply the functionality desired by computing resources within the virtualized computing environment.

DETAILED DESCRIPTION

Figure 1:
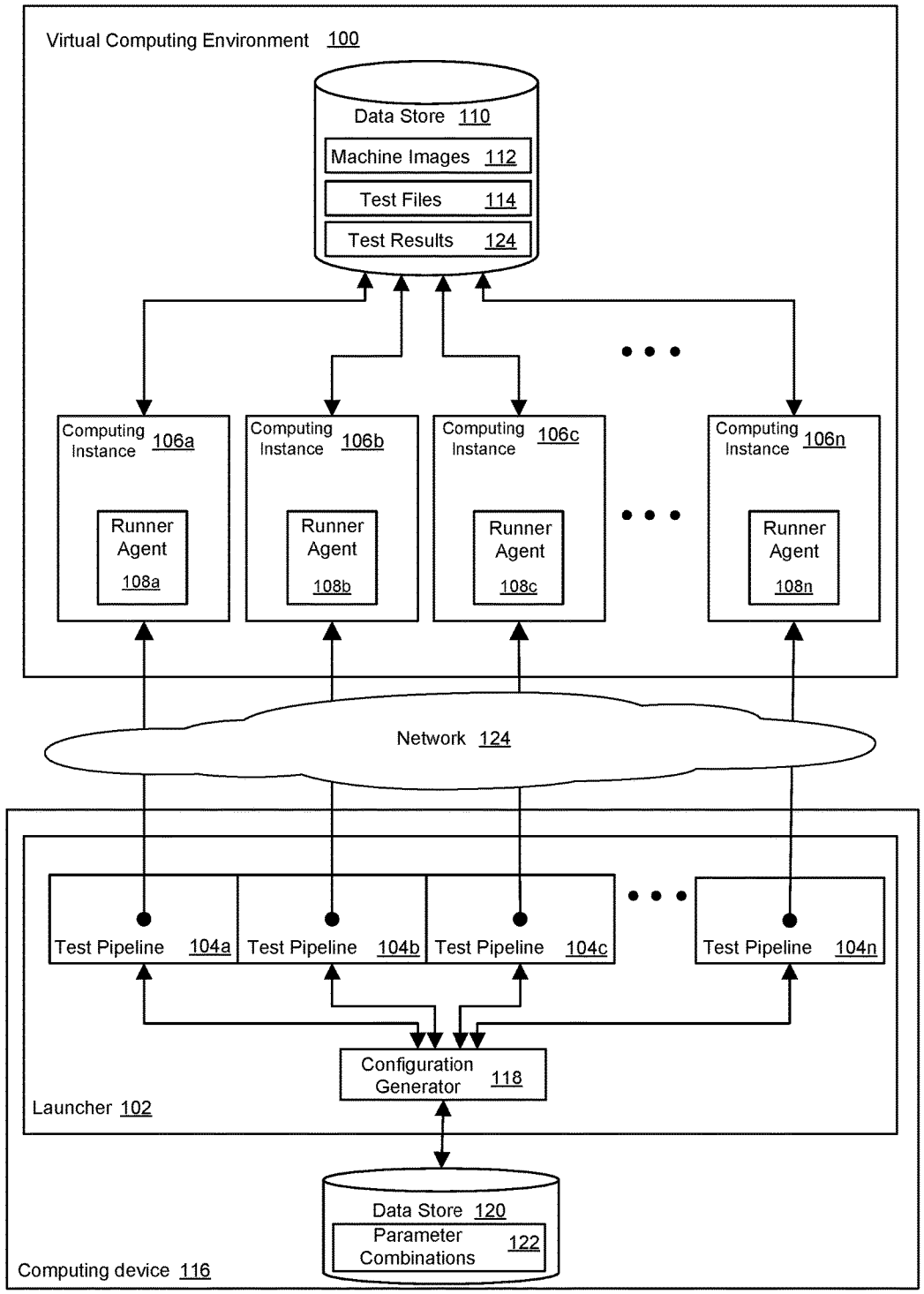
FIG. 1 is a block diagram illustrating an example of a virtual computing environment in which tests can be executed in accordance with an example of the technology.

Technologies described herein relate to testing for virtual computing resources in a virtual computing environment. Virtual computing resources may have many different types of configurations. A given configuration of a virtual computing resource that is a computing instance or virtual machine may include, for example, an image (e.g., an operating system image or a machine image) used for the resource, a type of memory or storage volume used by the resource (e.g., an amount of digital memory available to the resource and a speed at which the memory can be accessed), and/or a type of processing capability provided by or used by the resource (e.g., a number of processing cores operating at a specified processing speed).

This technology enables test data and test parameters to be stored in separate locations and allows tests to be parallelized and executed in locations that can be remote relative to the locations where test data and parameters are stored. In addition, combinations of test parameters that specify different and varying resource configurations may be generated automatically according to user-provided (e.g., through a plugin-based interface) or default methods in a manner that allows parameter-combination generation to be performed separately from test execution. Prioritization of the order in which parameter combinations are tested may also be provided. Further configurations provide throttling functionality that can be used to ensure that testing processes do not consume more than a desired amount of resources available to a user in a virtual computing environment.

In one example, a user may wish to verify that computing instances of several different configurations will perform acceptably when subjected to a single given test. In this example, a configuration of a computing instance may comprise a machine image (including an operating system and possibly other software), a volume type (referring to digital memory), and a processor type (e.g., possibly including a number of processors). If the user has determined that there are i master images, j volume types, and k processor types, and assuming that a configuration includes one master image, one volume type, and one processor type, there are i·j·k possible computing instance configurations. Rather than manually key in each individual combination, the user can supply a pattern (e.g., as a function or as an expression) that identifies the combinations corresponding to instance configurations that the user wishes to be tested. The pattern may, in this example, indicate that all i·j·k combinations should be tested. In other examples, however, the pattern may define a narrower subset of combinations. A configuration generator (e.g., a configuration generation module or a data generator) can use the pattern to create a list of the combinations to be tested and store the list in memory (e.g., random access memory or a data store).

At least one test pipeline can be created by a launcher (e.g., a launcher module) in order to initiate the execution of the test using a specific combination identified by the generated configurations. The launcher may be executed on a computing device that is in communication with the virtual computing environment through a network or may be executed on a computing instance or as part of a service within the virtual computing environment. For the purposes of this disclosure, a launcher can refer to a set of functions (e.g., a sequence of steps) that can be used to initiate, direct, or facilitate the execution of a test. The launcher may create multiple test pipelines that can be used in parallel. A test pipeline is a storage location for storing the identity of a test and the current status of that test.

In this example, a test pipeline may be used as follows. The test pipeline may receive a combination of actual parameters from a configuration generator indicating a computing instance configuration to be tested and the test to be performed. The values of the combination can identify a specific machine image, a specific block storage volume type, and a specific processor type. In addition, the combination of actual parameters can include identifiers for a test file and a storage location in which the test file may be found (e.g., in a data store).

The launcher may then launch the specific image identified by the combination in the test pipeline and cause a computing instance with the configuration identified by the combination to be instantiated in the virtual computing environment. The launcher can then cause a runner agent (e.g., a runner module) to be executed within the computing instance. The test files may be retrieved from a data store (e.g., an object data store) in the virtual computing environment and may be provided to the runner agent by the launcher or, alternatively, may retrieved directly by the runner agent. The runner agent may then execute the test. The results of the test, such as a test log, can be recorded in a data store.

After the runner agent has completed executing the test, the launcher may check the state of the test in the test pipeline and the launcher may determine that the test pipeline is ready to initiate another test. At that point, the launcher can select an additional combination of actual parameters to send to the test pipeline for the same test. The launcher may select the additional combination of actual parameters based on a rank, a priority, or a risk level associated with the additional combination of actual parameters. The test pipeline can then execute using the additional combination of actual parameters. Alternatively, a new test and new parameters may be selected.

The launcher may assign a rank, a priority, or a risk level to parameter combinations that are to be tested based on criteria provided by the user through an interface. For example, the user may indicate that combinations using a slower volume type paired with tests that are speed-sensitive are to be given a relatively high priority because the user believes that the slow volume type is likely to cause sub-par performance on speed-sensitive tests. The user may also indicate that combinations including a machine image with a specific version of an operating system paired with a test for a bug fix directed to that version may be given a relatively high priority.

The launcher may create multiple test pipelines so that multiple combinations of actual parameters may be tested in parallel. The number of test pipelines that are used in parallel, along with the amount of processing resources and/or storage resources used by the tests for those test pipelines, may be subject to one or more throttle constraints. Other quantities used by the tests for those test pipelines, such as an amount of networking bandwidth, a number of virtual networking devices to be used, and/or a number of database transactions, may also be subject to throttle constraints. The user may indicate such throttling constraints explicitly through an interface in the launcher. The user may, for example, indicate that no more than a predefined number of tests are to be executed for the test pipelines at once or that no more than a predefined number of computing instances should be running tests concurrently. The user may also indicate that no more than a predefined amount of processing resources or storage resources in the virtual computing environment should be cumulatively used by testing processes simultaneously so that resources will be available for other processes and services. In addition, default throttle constraints that reflect user account limits on the total amount of processing or storage resources that are accessible to the user or customer account in the virtual computing environment may be applied.

Throttle constraints may be applicable at multiple levels, may be applicable to tests and/or parameter combinations meeting certain criteria, and may be dynamic rather than static. For example, one throttle constraint may specify that no more than a predefined number of computing instances that are created using a specific machine image may be used for tests (e.g., at the level of an individual test pipeline or at the level of all test pipelines collectively) at the same time.

In another example, a throttle constraint may specify that computing instances using a specific machine image may not be allowed to use more than a specific quantity of a given resource at a time. In a further example, a throttle constraint may specify that computing instances used to test certain parameter combinations are allowed to perform no more than a predefined number of input/output (I/O) operations within a given timespan. In yet another example, a throttle constraint applicable to certain parameter combinations may dynamically vary as a function of time, percentage of available resources used, or some other quantity whose value is periodically updated.

Throttling constraints can be based on, or applicable to, a concurrency limit for a parameter type, a parameter value, or a limit for multiple levels of parameter types and parameter values in combination. More specifically, throttling constraints can be applied to the parameters that are used in parameter combinations to be tested. For example, a throttling constraint may specify that no more than a specified number of instances that use one type of machine image are to be tested or otherwise used concurrently. For example, a throttle constraint may specify that not more than five instances that are based on the same machine image should be used at a time and this constraint may apply to all available machine images. Alternatively, the number of concurrent instances based on some machine images can be excluded such that the throttle constraint only applies to some available machine images and not others.

Similarly, a throttle constraint may specify that no more than a specified number of instances that are of one instance type are to be tested or otherwise used concurrently. For example, a throttling constraint may specify that no more than ten concurrent instances based on one instance type are to be tested or otherwise used concurrently.

Multiple throttle constraints can be applied at the same time. One example of syntax that may be used to specify throttle constraints is provided below:

ImageID: [mi1, mi2, mi3]
InstanceType: [typeA, typeB, typeC, typeD]
Throttle: {
ImageId: 5,
InstanceType: {
  typeA: 10
}
}

The formal parameter ImageID corresponds to a machine image that may take on any one of the actual parameter values mi1 (machine image 1), mi2 (machine image 2), or mi3 (machine image 3). The formal parameter InstanceType corresponds to an instance type that may take on any of the actual parameter values typeA, typeB, typeC, or typeD. In the syntax for the Throttle structure or the set of throttle constraints, "ImageID: 5," signifies that no more than five instances based on any one machine image are to be used concurrently (i.e., the constraint applies at the parameter class level such that all available actual parameter values for ImageID are affected). The syntax "InstanceType: {typeA:

10}" indicates that no more than ten instances with an instance type of typeA are to be used concurrently (i.e., the constraint applies at the parameter value level such that the constraint effect is limited to specifically enumerated actual parameter values). Instances with other instance types, such as typeB, typeC, or typeD, are unaffected.

Throttle constraints may also be inferred for a given customer account based on account limits that apply to the customer account in a service environment. Such inferred or implicit throttle constraints may include limits applicable to numbers of instances, and volumes, but may also include limits on rates (e.g., API call rates, Input-output operations rates, etc.).

An engineer may wish to test virtual computing resources with many different configurations to ensure that resources using those configurations will perform acceptably under desired conditions. However, if the engineer specifies test parameters, stores test data, and executes these tests manually, the testing process may consume an inordinate amount of time and human intervention. Accordingly, this technology can provide automated testing for a virtual computing environment with reduced engineer or user input at testing time.

FIG. 1 is a block diagram illustrating an example of a virtual computing environment 100 in which tests can be executed and an example of a computing device 116 on which a launcher 102 can be executed. A configuration generator 118 may identify parameter combinations 122 based on a user-provided pattern, definition, or function. The parameter combinations 122 may be stored in a data store 120 at the computing device 116.

The launcher 102 may use test pipelines 104a-n to facilitate testing using the parameter combinations 122. While only four test pipelines are shown in FIG. 1, any number of test pipelines may be initiated by the launcher 102. The launcher 102 may load a configuration and test from the configuration generator 118 and may assign a respective parameter combination to each of the test pipelines 104a-n. The launcher 102 may assign parameter combinations to the test pipelines 104a-n sequentially or based on ranks or priorities assigned to the parameter combinations.

In this discussion, the term "formal parameter" refers to a parameter that appears in a declaration for a modular unit of computing code such as, but not limited to, a function, a method, a procedure, a constructor, or a macro (e.g., in a header file or a source file). The term "actual parameter" refers to a value that is passed to a modular unit of computing code (e.g., a function, method, procedure, or macro) when the modular unit of computing code is called or invoked, such as in the case of an API (application program interface) call. In some APIs, actual parameters are related to formal parameters by positional association. For example, if a definition for a specific function in an API has n formal parameters listed in a specific order, an API call for that function can also have n actual parameters listed. An actual parameter at a jth position in the API call can correspond to the formal parameter that appears in the jth position of the definition for the function in the API. Alternatively, in some APIs, a call for a function can include a list of key-value pairs wherein each key is a formal parameter and the value associated with the key is the actual parameter corresponding to the formal parameter.

There are many possible types of patterns, definitions, or functions that may be used by a configuration generator 118 to identify parameter combinations 122. A method of generating configurations may include a combinatorial expansion, a random sample, a risk-based selection process, or a pair-wise selection process. In one example, a combinatorial expansion may be used. A combinatorial expansion may comprise all possible combinations of actual parameter values that are to be tested. For instance, suppose that the formal parameters that define an instance configuration are (MachineImage, InstanceType). Also suppose that the actual parameter values to be tested for MachineImage are {Image1, Image2, Image3} and the actual parameter values for be tested for InstanceType are {Type1, Type2}. A combinatorial expansion would produce the set of unique actual parameter combinations {(Image1, Type1), (Image1, Type2), (Image2, Type1), (Image2, Type2), (Image3, Type1), (Image3, Type2)}. More generally, for formal parameters $p_1, p_2, \ldots, p_n$ that define a configuration, there may be corresponding sets of actual parameter values $P_1, P_2, \ldots, P_n$. The number of actual parameter combinations produced by a combinatorial expansion is $$\prod_{i=1}^{n} |P_i|$$

where $|P_i|$ is the cardinality of the set of actual parameter values $P_i$.

In another example, it may be impractical or otherwise undesirable to test all parameter combinations that would be produced by a combinatorial expansion. Hence, a user may specify that a random sample of a specified size be drawn from the set parameter combinations. The parameter combinations of the sample may then be tested.

In other examples, a bias may be intentionally specified so that certain actual parameter combinations are more likely to be chosen for the sample than others. If actual parameter combinations including a specific machine image, for example, are deemed more likely to fail a given test, a biased sample can be drawn such that parameter combinations including the specific machine image are more likely to be chosen for the sample. A bias may also be defined in terms that encompass more than one formal parameter and more than one actual parameter value for each formal parameter.

A risk-based selection process may also be used to select parameter combinations to be tested and/or a priority order in which parameter combinations are to be tested. Parameter combinations deemed more likely to fail a given test may be assigned risk values denoting a high likelihood of failure (and thus a high priority for testing). Alternatively, parameter combinations that are more likely to be used in a practical implementation for which test compliance is desired may be assigned risk values denoting high priority. If sampling is used, parameter combinations with risk values denoting a high priority may be more likely to be selected. Parameter combinations with risk values denoting a high priority may also be placed ahead of parameter combinations with risk values denoting lower priority in a queue of parameter combinations to be tested. Parameter combinations with risk values meeting a threshold test may also be included in the test parameter combinations.

In another example, a pair-wise selection process can be used to identify parameter combinations to be used. A round-robin approach, for example, may be used. For the formal parameters (a, b), suppose the sets of corresponding actual parameter values are ({a1, a2}, {b1, b2, b3, b4, b5}). The parameter combinations defined by a pairwise selection process can be (a1, b1), (a2, b2), (a1, b3), (a2, b4), and (a1, b5). More generally, for formal parameters $p_1, p_2, \ldots, p_n$ that define a configuration, there may be corresponding sets of actual parameter values $P_1, P_2, \ldots, P_n$. Also let the elements of each set of actual parameter values $P_i$ for all $1 \le i \le n$ be defined as $\{\delta_{i,1}, \ldots, \delta_{i,|P_i|}\}$, where the first subscript i is the index of the respective set of actual parameter values and of the corresponding formal parameter, the second subscript is the index of the element in the respective set of actual parameter values, and $|P_i|$ is the cardinality of the set of actual parameter values $P_i$. Let $P_x$ be the set of actual parameter values such that $|P_x| \ge |P_i|$ for all $1 \le i \le n$, where $1 \le x \le n$. The parameter combinations can be defined as the actual parameter combinations represented by the expression $(\delta_{1,\beta}, \delta_{2,\beta}, \ldots, \delta_{x,\alpha}, \ldots \delta_{n,\beta})$, where, for a given actual parameter value, $$\beta = \begin{cases} |P_i|, & \alpha \bmod |P_i| = 0 \\ \alpha \bmod |P_i|, & \alpha \bmod |P_i| \ne 0 \end{cases}$$

where $i \ne x$, $1 \le \alpha \le |P_x|$, $\alpha \in \mathbb{N}$, $i \in \mathbb{N}$, mod is the modulus operator, $|P_x|$ is the cardinality of the set of actual parameter values $P_x$, and $|P_i|$ is the cardinality of the set of actual parameter values $P_i$.

A communication may be sent through a network 124 by the launcher 102, for each of the test pipelines 104a-n, in order to initiate the creation of a computing instance in the virtual computing environment 100 based on a configuration identified by the test pipeline's respective parameter combination. The data in test pipeline 104a, for example, may be used by the launcher 102 initiate the creation of a first computing instance 106a, data in test pipeline 104b may be used to initiate the creation of a second computing instance 106b, data in test pipeline 104c may be used to initiate the creation of a third computing instance 106c, data in test pipeline 104n may be used initiate the creation of an nth computing instance 106n, and so forth. The computing instances 106a-n may be created using machine images 112 from the data store 110. Each of the computing instances 106a-n may execute a respective runner agent 108a-n to run a test from the launcher 102 for a test pipeline through which the computing instance may be tested. A first computing instance 106a, for example, may execute runner agent 108a, a second computing instance 106b may execute runner agent 108b, a third computing instance 106c may execute runner agent 108c, a fourth computing instance 106n may execute runner agent 108n, and so forth. Each of the runner agents 108a-n may retrieve one or more tests from the test files 114 and execute the one or more tests in accordance with the parameter combination provided to the runner agent's corresponding test pipeline. Information produced as a result of the tests run by the runner agents 108a-n can be stored as the test results 124 in the data store 110.

Each of the test pipelines 104a-n can include a state of the test that is currently assigned to the test pipeline. In one example, each of the test pipelines 104a-n can include one of three possible states. One of the three states may indicate that the test is being set up (e.g., an instance with the configuration is being created), while another state may indicate that the test is currently in progress. The third state may indicate that the test has been completed. In an alternative configuration, the state of a test may be: launching, running, completed and done (e.g., the done state may indicate that cleanup should be performed and/or another test should be loaded).

In an alternative configuration of the technology, three test pipelines or queues may be maintained that hold the tests. The three test pipelines may be a pending test pipeline, a running test pipeline, and a done test pipeline containing multiple configuration files associated with individual tests. A configuration file (and test) may move or transition from the pending test pipeline to the running test pipeline to the done test pipeline (e.g., queue), as the configuration transitions from waiting to launch states, launched to running states, and launched to terminated states, respectively. Thus, each test pipeline may hold many configuration files that are in a single state as opposed to putting one configuration and test into each test pipeline and tracking the multiple states in the test pipeline.

When the runner agent 108a-n of a computing instance 106 a-n corresponding to a particular test pipeline has completed running a test, the launcher 102 can send a communication to the configuration generator 118 indicating that the test pipeline is ready to receive another test configuration (e.g., parameter combination). For example, if runner agent 108a completes a test, the launcher 102 may request the test state from a computing instance 106a and the launcher 102 may receive a message indicating the test's completion, and then the state of the test in the test pipeline 104a may be changed. The launcher 102 can then send a communication to the configuration generator 118 indicating that the test pipeline 104a is ready for another parameter combination. The configuration generator 118 may then assign another parameter combination from the parameter combinations 122 to the test pipeline 104a, and the assignment may be based on a priority or a rank of the parameter combination. If the parameter combination calls for a computing instance with the same configuration as the computing instance 106a, the computing instance 106a and the runner agent 108a may, in some cases, be re-used. Otherwise, the test pipeline 104a can delete and replace the computing instance 106a with another computing instance that has the configuration for the parameter combination and repeat the testing process described above with respect to the test pipelines 104a-n.

The present technology provides certain valuable technological results. First, the tests that are executed for each test pipeline (as well as a launcher that initiates the test pipeline) can be executed using separate hardware resources. The launcher and the test pipeline, for example, may be executed at a computing device that is in communication with the virtual computing environment through a network or at a service in the virtual computing environment. The computing instance (and the runner agent) used to execute the test can be executed on separate hardware resources of the virtual computing environment.

Another result provided by the technology of this example is that the user can define and modify the pattern or method which controls the creation of parameter combinations to be used for executing a desired test without having to modify the test itself. Furthermore, the user can provide test criteria (i.e., parameter combination and/or test weighting) that can be used to determine an order in which parameter combinations are to be tested.

Another result provided by this technology is that parallelized tests can be initiated and managed by the launcher 102 using a single thread rather than multiple threads (e.g., a single thread operating synchronously rather than asynchronously). The launcher 102 can iteratively check the test pipelines 104a-n and manage the states of the test configurations and tests without having to establish more than a single thread.

In one example, a user may wish to apply qualification testing to virtual computing resources in a virtual computing environment. The term "qualification testing," in the context of the present disclosure, can refer to a process by which an engineer executes a series of tests (e.g., automated tests) against virtual computing resources (e.g., computing instances). Qualification testing can be used, for example, to measure, validate, and quantify the quality of the resources that are tested. A qualification testing plan may include, for example, a collection of predefined tests and associated criteria by which a computing resource's performance on the predefined tests is to be measured.

While the tests are described in FIG. 1 as being executed on a computing instance 206a-n, the tests could also be executed using other types of executable units or objects within the virtual computing environment. For example, a function that is autonomous or part of an application can be executed (e.g., loaded using API calls) in a virtual computing environment 200 without launching a computing instance, and the results of the function may be returned to a caller. In one example case, the function may be hosted by a managed service within the virtual computing environment 200 which enables the function to run (e.g., in a container that the managed service controls) and results may be provided to the caller of the function.

Figure 2:
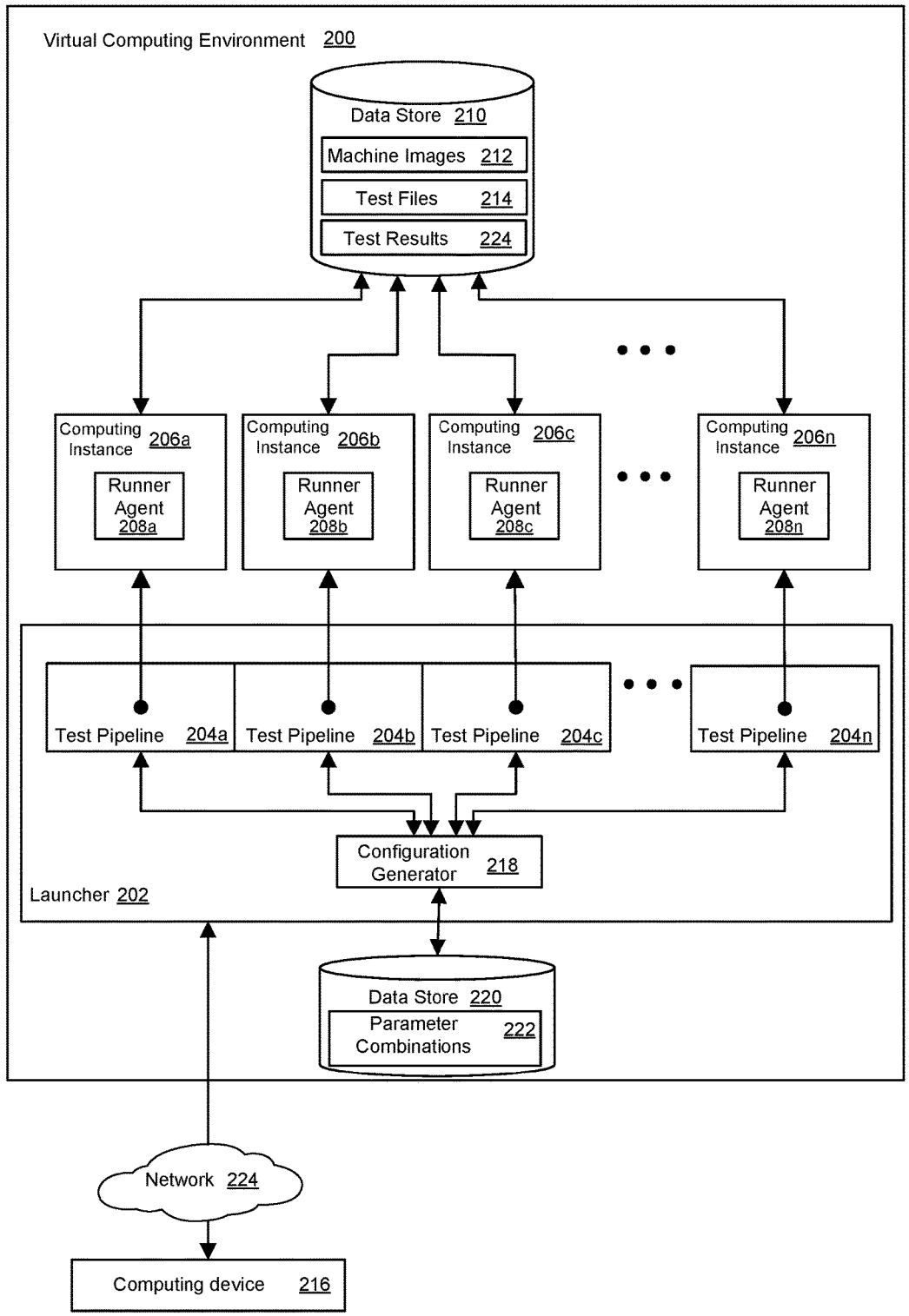
FIG. 2 is a block diagram illustrating an example of a virtual computing environment in which testing can be provided in accordance with an example of the technology.

FIG. 2 is a block diagram illustrating an example of a virtual computing environment 200 in which testing protocols may be provided using user input. In the example of FIG. 2, the launcher 202 is executed in the virtual computing environment 200 rather than on the computing device 216. The launcher 202 may run on a computing instance in the virtual computing environment 200 or may be part of a managed service in the virtual computing environment 200. A user can interface with the launcher 202 from the computing device 216 via a network 224.

A configuration generator 218 may generate parameter combinations 222 based on a user-provided pattern, definition, or function. The parameter combinations 222 may be stored in a data store 220 in the virtual computing environment 200. The launcher 202 may use test pipelines 204a-n to facilitate testing using the parameter combinations 222. While only four test pipelines are shown in FIG. 2, it is to be understood that more or less test pipelines may be initiated by the configuration generator 218. The configuration generator 218 may assign a respective parameter combination to each of the test pipelines 204a-n. The configuration generator may also assign parameter combinations to the test pipelines 204a-n sequentially or based on ranks or priorities assigned to the parameter combinations.

Each of the test pipelines 204a-n may be used to initiate the creation of a computing instance in the virtual computing environment 200 based on a configuration identified by the test pipeline's respective parameter combination. Test pipeline 204a for example, may be used to initiate the creation of computing instance 206a, test pipeline 204b may be used to initiate the creation of computing instance 206b, test pipeline 204c may be used to initiate the creation of computing instance 206c, test pipeline 204n may be used to initiate the creation of computing instance 206n, and so forth. The computing instances 206a-n can be created using machine images 212 from the data store 210. Each of the computing instances 206a-n can execute a respective runner agent 208a-n to run a test for the test pipeline to which the computing instance corresponds. Computing instance 206a, for example, may execute runner agent 208a, computing instance 206b may execute runner agent 208b, computing instance 206c may execute runner agent 208c, computing instance 206n may execute runner agent 208n, and so forth. Each of the runner agents 208a-n can retrieve one or more tests from the test files 214 and execute the one or more tests in accordance with the parameter combination provided to the runner agent's corresponding test pipeline. Information produced as a result of the tests run by the runner agents 208a-n can be stored as the test results 224 in the data store 210. For example, the data store 210 may be an object store that is a secure durable, distributed virtualized store that is accessible through a virtual computing environment.

The computing instances 206a-n, the runner agents 208a-n, and any computing instances being tested may, in some examples, be executed and/or tested in a customer's private virtualized computing environment (e.g., a "private cloud"). In other examples, the testing may be performed using a public cloud.

When the runner agent of a computing instance corresponding to a particular test pipeline has completed running a test, the launcher 202 can test the test pipeline to determine that a test is complete and can send a communication to the configuration generator 218 indicating that the test pipeline is ready to receive another parameter combination. In one example, if runner agent 208a completes a test, the computing instance 206a can inform the launcher 202 of the test's completion and the status of the test can be updated in the test pipeline 204a. The launcher 202 can then send a communication to the configuration generator 218 indicating that the test pipeline 204a is ready for another parameter combination. The configuration generator 218 may then assign another parameter combination from the parameter combinations 222 to the test pipeline 204a. In addition, the assignment may be based on a priority or a rank of the parameter combination.

Figure 3:
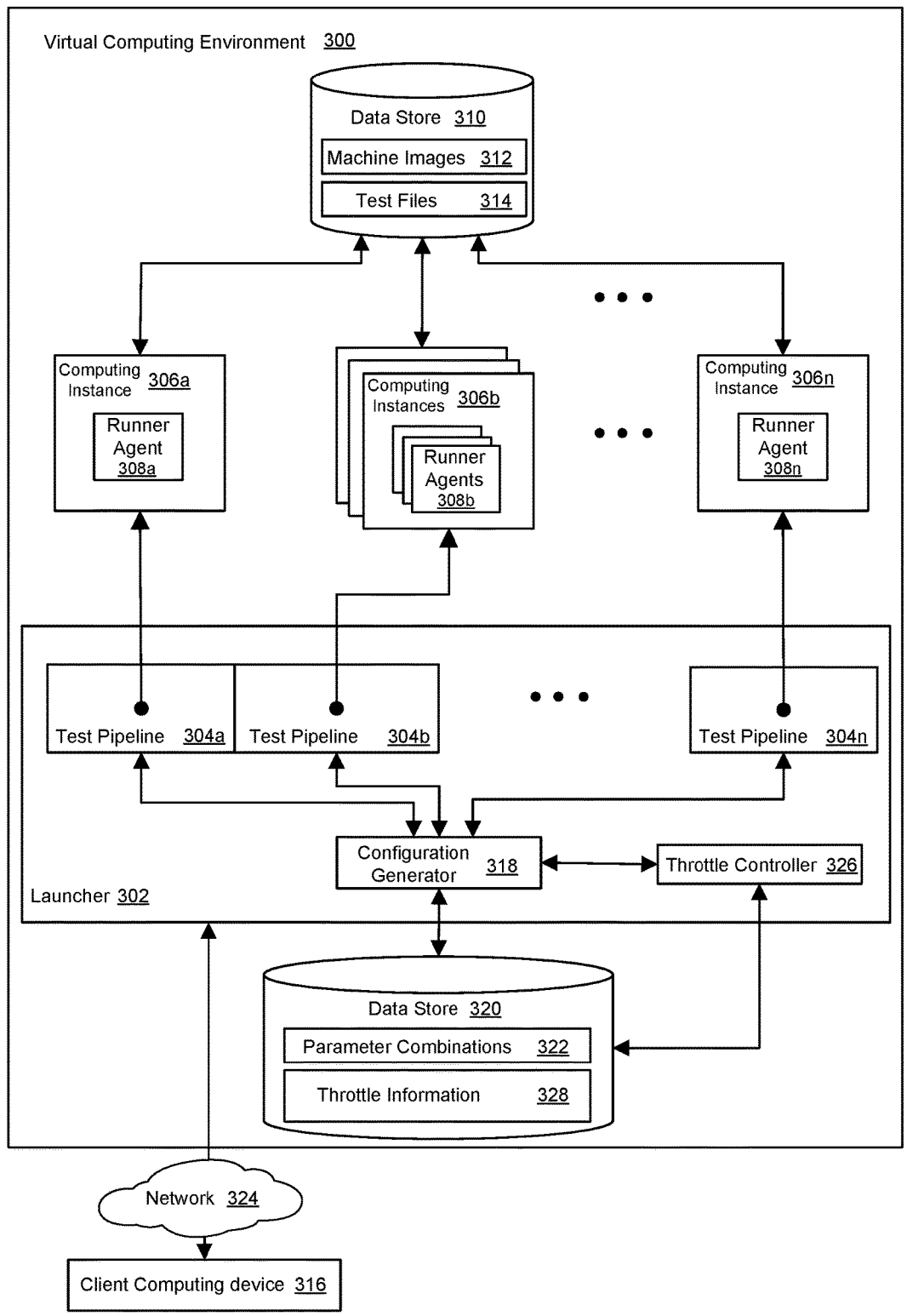
FIG. 3 is a block diagram illustrating another example of a virtual computing environment in which testing can be provided in accordance with an example of the technology.

FIG. 3 is a block diagram illustrating another example of a virtual computing environment 300 in which a testing methods in accordance with the present disclosure can be provided. In particular, FIG. 3 illustrates an example in which throttling functionality is used. A user can interface with the launcher 302 from the computing device 316 via a network 324.

A configuration generator 318 may identify parameter combinations 322 based on a user-provided pattern, definition, or function. The parameter combinations 322 may be stored in a data store 320 in the virtual computing environment 300. The launcher 302 may use test pipelines 304a-n to facilitate testing using the parameter combinations 322. While only four test pipelines are shown in FIG. 3, more or fewer test pipelines may be initiated by the configuration generator 318 or launcher 302.

Throttle information 328 in the data store 320 may include, for example, a predefined limit on the number of test pipelines that are to be executed in parallel. If such a limit on the number of test pipelines exists, the throttle controller 326 can notify the configuration generator 318 of the limit and the configuration generator 318 (or the launcher 302) may then verify that the number of test pipelines executed in parallel conforms to the limit. The configuration generator 318 may assign a respective parameter combination to each of the test pipelines 304a-n. The configuration generator may assign parameter combinations to the test pipelines 304a-n sequentially or based on ranks or priorities assigned to the parameter combinations.

Data from each of the test pipelines 304a-n may be used to initiate the creation of a computing instance in the virtual computing environment 300 based on a configuration identified by the test pipeline's respective parameter combination. Test pipeline 304a for example, may be used to initiate the creation of computing instance 306a, test pipeline 204n may be used to initiate the creation of computing instance 206n, and so forth. In some cases, as shown for test pipeline 304b, the respective parameter combination assigned to the test pipeline may call for a test that requires multiple computing instances 306b to be launched for the test pipeline in order for the test to be executed. The computing instances 306a-n can be created using machine images 312 from the data store 310. The throttle information 328 may include a predefined limit on how many computing instances are allowed to exist in parallel in the virtual computing environment 300 or in association with a corresponding customer account. If such a limit is included in the throttle information 328, the throttle controller 326 can notify the launcher 302 and the launcher 302 can then verify that the total number of computing instances that exist in parallel for all test pipelines 304a-n conforms to the limit.

Each of the computing instances 306a-n can execute a respective runner to run a test for the test pipeline to which the computing instance corresponds. Computing instance 306a, for example, may execute runner agent 308a, computing instance 306b may execute runner agent 308b, computing instance 306n may execute runner agent 308n, and so forth. Each of the runner agents 308a-n may retrieve one or more tests from the test files 314 and execute the one or more tests in accordance with the parameter combination provided to the runner agent's corresponding test pipeline. Information produced as a result of the tests run by the runner agents 308a-n can be stored as the test results 324 in the data store 310.

Throttle information 328 in the data store 320 may include, for example, a predefined limit on an amount of processing resources and/or memory resources that are to be collectively used by the computing instances 308a-n. If such a limit is included, the throttle controller 326 can notify the configuration generator 318 of the limit and the configuration generator 318 can then verify that the processing resources and/or memory resources collectively used by the computing instances 308a-n conform to the limit.

When the runner agent of a computing instance corresponding to a particular test pipeline has completed running a test, the launcher 302 may check to see that the test is complete and the launcher 302 can send a communication to the configuration generator 318 indicating that the test pipeline is ready to receive another parameter combination. In an alternative example, if runner agent 308a completes a test, the computing instance 306a may inform the launcher 302 of the test's completion and that status may be updated in the test pipeline 304a. The launcher 302 can then send a communication to the configuration generator 318 indicating that the test pipeline 304a is ready for another parameter combination. The configuration generator 318 can then assign another parameter combination from the parameter combinations 322 to the test pipeline 304a, and the assignment may be based on a priority or a rank of the parameter combination.

Figure 4:
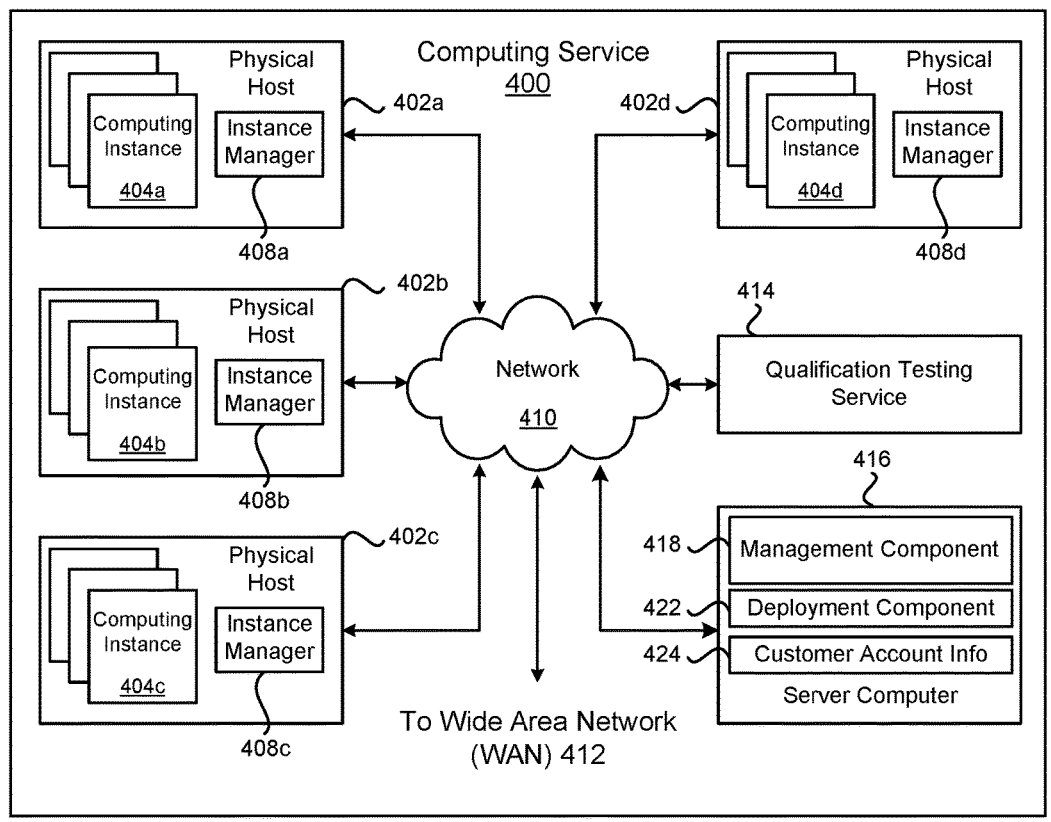
FIG. 4 is a block diagram of a computing service environment in accordance with an example of the technology.

FIG. 4 is a block diagram illustrating an example computing service 400 that may be used to execute and manage a number of computing instances 404a-d. The computing instances 404a-d may include the destination host described above. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running browsers or other lightweight client applications, for example. Those familiar with the art will recognize that the computing service 400 may be described as a "cloud" environment.

The particularly illustrated computing service 400 may include a plurality of server computers 402a-d. The server computers 402a-d may also be known as physical hosts. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute a qualification testing service that may perform testing functions as described earlier. In addition, the server computer 414 may include functionality of the launcher 202 or the launcher 303.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, as many more networks and networking devices may be utilized to interconnect the various computing systems disclosed herein.

Figure 5:
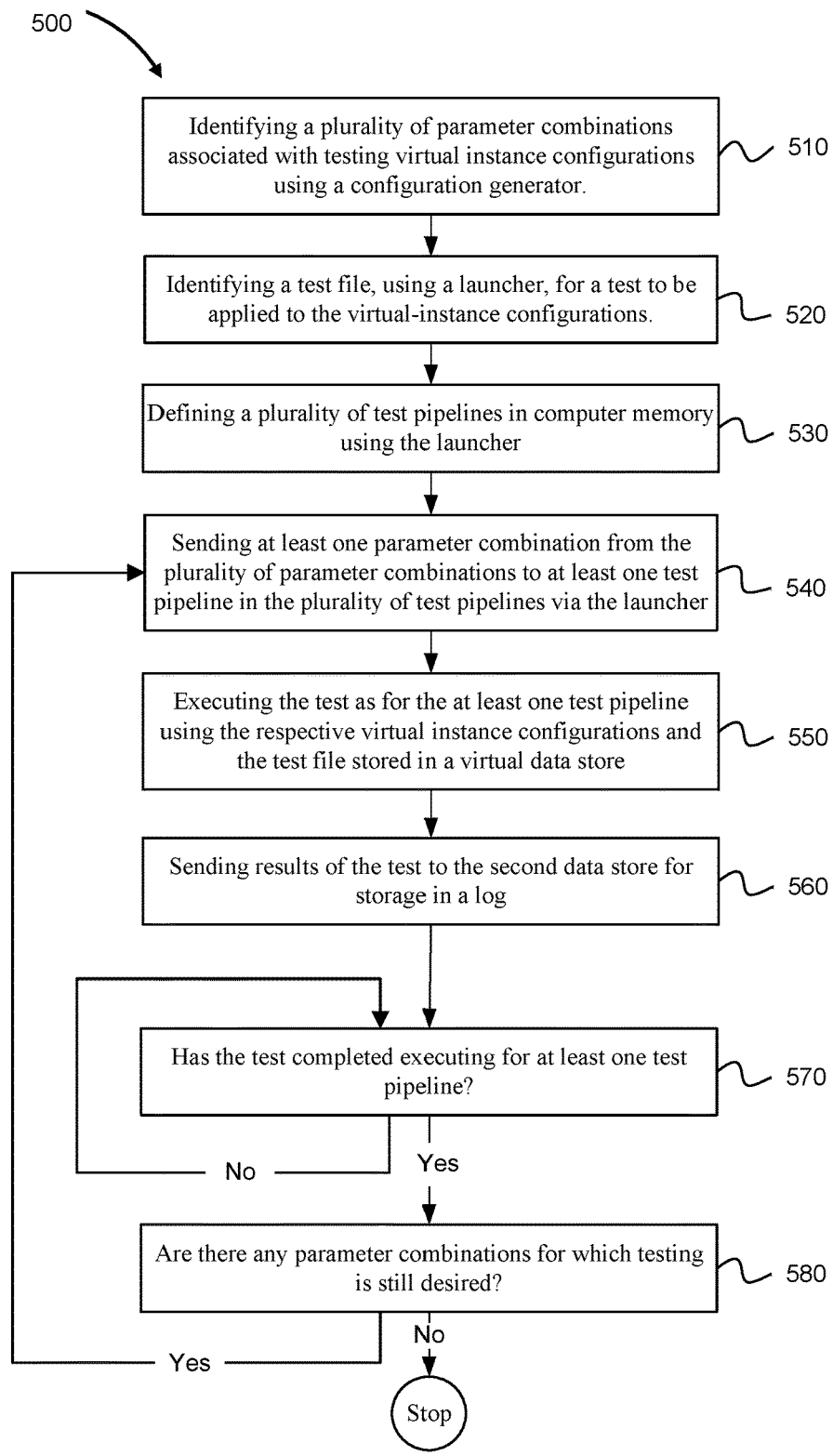
FIG. 5 is a flowchart of a method for performing tests in accordance with an example of the technology.

FIG. 5 is a flowchart of a method 500 for performing synchronous tests in accordance with an example. The method may be implemented by a system comprising one or more processors and a memory device including instructions that, when executed by the one or more processors, perform the following operations discussed below.

As in block 510, one operation of the method may be identifying a plurality of parameter combinations associated with testing virtual instance configurations using a configuration generator. The parameter combinations may be stored in a first data store of parameter combinations. The first data store may be data store that is local to a launcher. Each parameter combination can define a respective virtual instance configuration to be tested. For example, a parameter combination can identify an image of a virtual instance and a set of virtual hardware resources (e.g., processing resources and memory resources) to be used to instantiate a virtual instance from the image.

Examples of a virtual instance that may be tested can include, for example, a computing instance, a virtual switch, a virtual router, a virtual gateway, a virtual proxy device, a network address translation (NAT) gateway, a web application firewall (WAFs), a data store, a database, a database cluster, a high performance computing (HPC) cluster, or a virtual private network (VPN) connection device.

The parameter combinations can be identified by the configuration generator using one or more of: a combinatorial expansion, a random sample, a risk-based selection process, or a pair-wise selection process. In addition, the parameter combinations can be identified by the configuration generator using a parameter combination selection formula provided by a user via a plug-in.

As in block 520, another operation may be identifying a test file, using the launcher, for a test to be applied to the virtual-instance configurations. The test file may be stored in a second data store in a virtual computing environment As in block 530, a further operation may be defining a plurality of test pipelines in computer memory using the launcher. A test pipeline may store information about a test and test configurations that may be used to initiate, direct, or facilitate the execution of a test.

As in block 540, another operation may be sending at least one parameter combination from the plurality of parameter combinations to at least one test pipeline in the plurality of test pipelines via the launcher.

As in block 550, another operation may be executing the test on a virtual instance launched by a runner agent, for the at least one test pipeline using the virtual instance configurations and the test file retrieved from the second data store. More specifically, for example, the test can be executed using a virtual instance configuration and a set of actions can be performed. The set of actions can include, for example, identifying a virtual instance based on the respective virtual-instance configuration defined by the respective parameter combination; retrieving the test file from the data store; and applying the test to the virtual instance using the test file.

As on block 560, another operation may be sending results of the test to the second data store for storage in a log.

As in block 570, the launcher can check the status of the test pipelines until the test for at least one test pipeline has been completed. The test pipelines can be iteratively checked in order to detect that a test for a test pipeline has been completed.

As in block 580, if there are any parameter combinations for which testing is still desired, the flow of operations can return to block 540. (Otherwise, the operations can come to an end.) Once this test pipeline for which the test has been completed has been identified, a next parameter combination for testing can be selected from the plurality of parameter combinations and designated for the test pipeline. The next parameter combination can be selected based on a rank, a priority, or a risk level associated with the next parameter combination. In some examples, the next parameter combination may not have been used for the test previously. In other examples, the next parameter combination may have been previously used for the test (e.g., when redundant testing is desired). Another operation may be signaling the test pipelines to delete computing instances created for the test after execution of the test in the test pipeline is completed.

Figure 6:
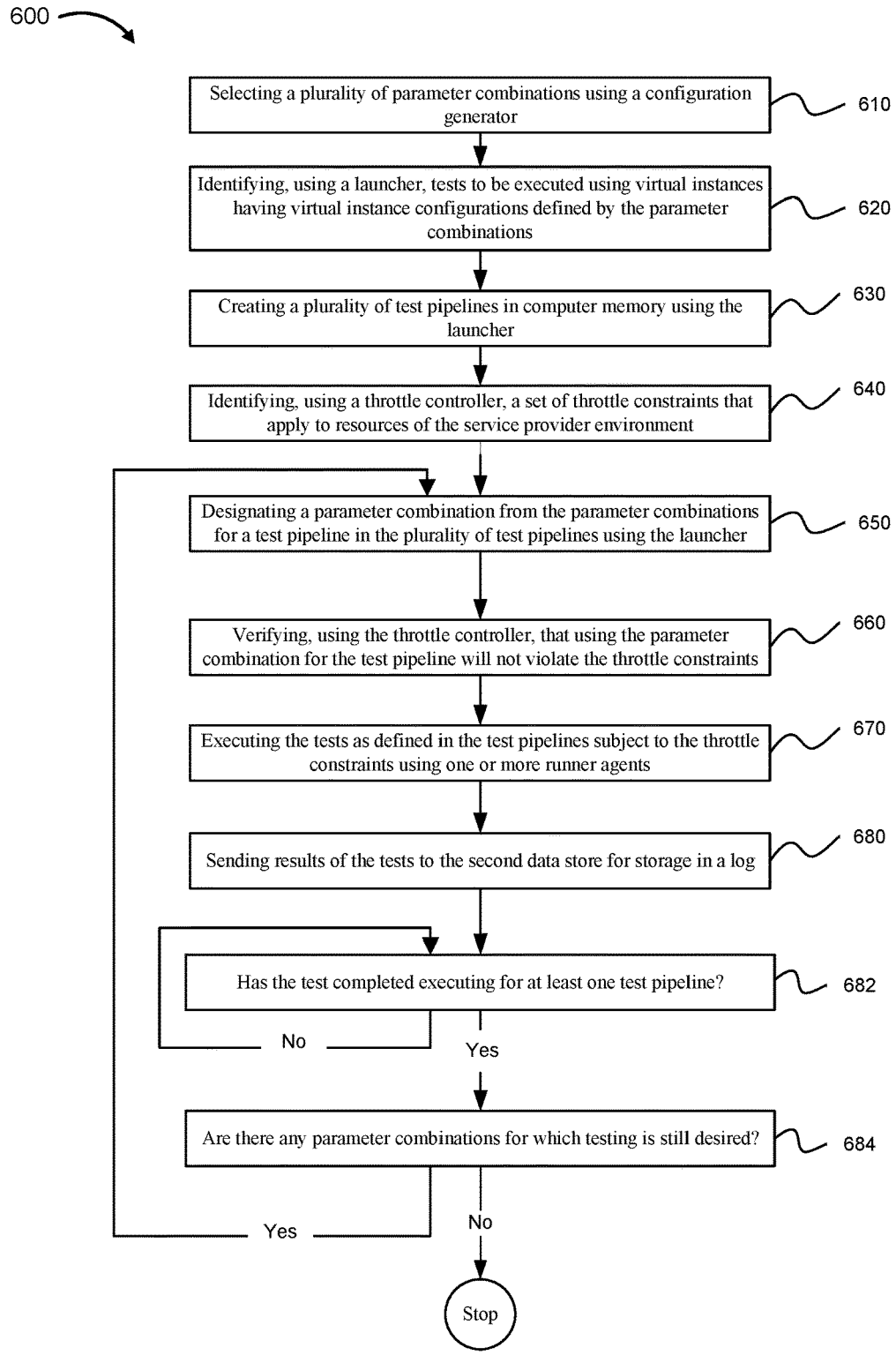
FIG. 6 is a flowchart of a method for performing tests subject to throttle constraints in accordance with an example of the technology.

FIG. 6 is a flowchart of a method 600 for performing synchronous tests subject to throttle constraints in accordance with an example. The method may be implemented by a system comprising one or more processors and a memory device including instructions that, when executed by the one or more processors, perform the following operations.

As in block 610, one operation of the method 600 may be selecting a plurality of parameter combinations using a configuration generator. A parameter combination may define a virtual instance configuration and may be stored in a first data store. The plurality of formal parameters may include, for example, an image, an instance type, and a volume type. An instance type may specify, for example, a combination of processing resources, memory resources, storage resources, and networking capacity for a virtual instance.

The plurality of formal parameters may also include a volume type, a type of disk, a geographical region, and a geographical availability zone. A geographical region may indicate a set of locations (e.g., in a continent or a country) in which physical data and/or processing centers for a service provider environment are housed. An availability zone may indicate a specific site or data center within the geographical region at which physical data is stored and/or processing occurs. Availability zones that belong to the same geographical region may be connected to each other through low-latency links.

As in block 620, another operation may be identifying, using a launcher, tests to be executed using virtual instances having virtual instance configurations defined by the parameter combinations in the plurality of parameter combinations. The tests may be stored in a second data store As in block 630, another operation may be creating a plurality of test pipelines in computer memory using the launcher.

As in block 640, another operation may be identifying, using a throttle controller, a set of throttle constraints that apply to resources of the service provider environment.

As in block 650, another operation may be designating a parameter combination from the parameter combinations for a test pipeline in the plurality of test pipelines using the launcher.

As in block 660, another operation may be verifying, using the throttle controller, that using the parameter combination for the test pipeline will not violate the throttle constraints. Parameter combinations can be selected such that, if tests for the test pipelines execute in parallel using the parameter combinations, no throttle constraints will be violated. In some examples, the throttle constraints can be dynamically adjusted based on permissions or preferences associated with a customer account that provides access to the service provider environment. The throttling constraints can comprise, for example, a limit applicable to a number of test pipelines to be concurrently used within the service provider environment, a limit applicable to a number of virtual instances to be concurrently tested in the plurality of test pipelines, a limit applicable to a quantity of hardware processing resources to be concurrently used by the plurality of test pipelines, and/or a limit applicable to a quantity of hardware memory resources to be concurrently used by the plurality of test pipelines.

As in block 670, another operation may be executing the tests as defined in the test pipelines subject to the throttle constraints using one or more runner agents. As in block 680, another operation may be executing the tests as defined in the test pipelines subject to the throttle constraints. The test pipelines may send test results to a virtual data store for storage in a log.

As in block 682, In addition, the test pipelines can be checked (e.g., iteratively) in order to detect that a test in a test pipeline that has completed executing. As in block 684, it can also be determined whether there are any parameter combinations for which testing is still desired. If not, the operations can come to an end. If further testing is desired, the flow of operations can return to block 650. A next parameter combination can be identified. It can be determined by the throttle controller that executing the tests via the test pipeline using a virtual instance based on the next actual parameter combination will not violate the set of throttle constraints. In some examples, the next parameter combination may not have been previously used for testing.

In other examples, the next parameter combination may have been previously tested (e.g., when redundant testing is desired).

In another example, the operation of a launcher can be summarized using the following pseudo code:

```
While there are tests that still need to be executed
    If resources currently being used for tests are less than throttle
      constraints
        Launch test
        Update test pipeline for test to running state
    Else
        Break
    End If
End While
While there are tests in running
    For each test that is running
        Get current status of test
        If the status indicates test is completed
            Analyze test
            Update test pipeline for test to done state
            If there are tests in pending
                Launch test
                Update test pipeline for test to running state
            End If
        End If
    End For
End While
```

Figure 7:
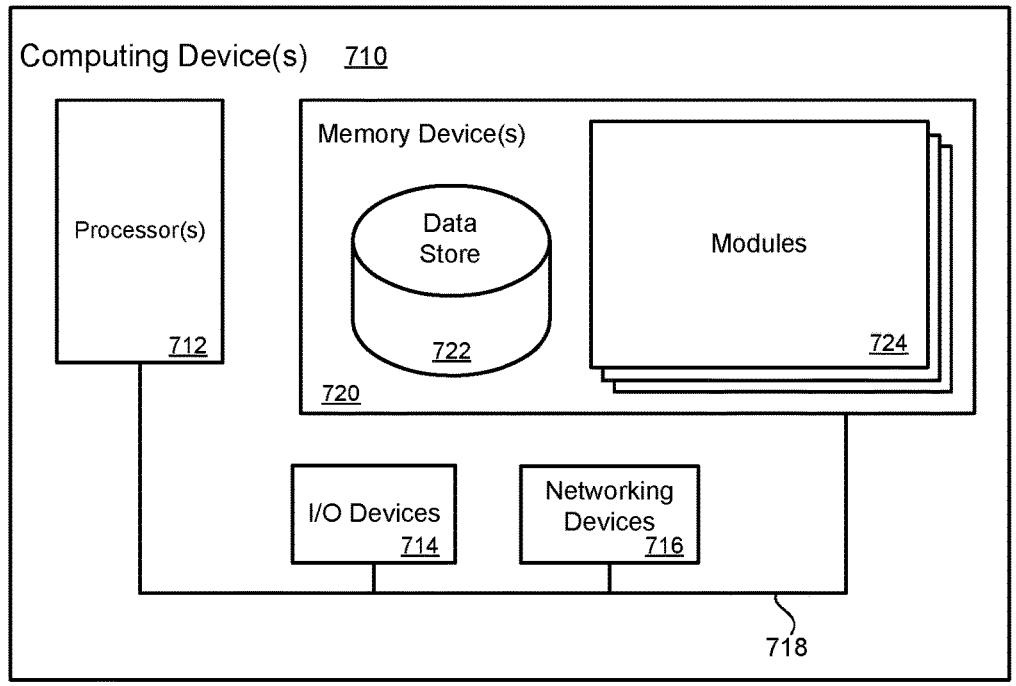
FIG. 7 is block diagram illustrating a computing device that may be employed in the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices.

Other known I/O device may be used with the computing device as desired. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system of performing synchronous testing in a service provider environment, comprising:
   a service provider environment including a plurality of computing instances, wherein the plurality of computing instances include one or more runner agents for performing the synchronous testing, and the plurality of computing instances are virtual computing resources;
   a data store connected to the service provider environment via a network, wherein a first data store stores test files and test results;
   a computing device connected to the service provider environment via a network, the computing device including:
      a launcher to define a plurality of test pipelines;
      a configuration generator to select a plurality of parameter combinations, wherein the plurality of parameter combinations define a plurality of configurations of computing instances in the service provider environment to be tested;
      at least one memory for storing information associated with the test pipelines and the parameter combinations;
      wherein the computing device:
      identifies a test file from the data store for a test that is to be applied to the plurality of configurations of computing instances in parallel;
      designates a first parameter combination from the plurality of parameter combinations, using the configuration generator, and the test for the test pipeline in the plurality of test pipelines, wherein the runner agent runs the test based at least in part on the computing instance configuration and the test file, and sends the test results to the data store, wherein the test is run in parallel to the test being run based on a second parameter combination;
      detects when the test in a test pipeline has been completed;
      identifies a next parameter combination, using the configuration generator, from the plurality of parameter combinations; and
      applies the next parameter combination as the parameter combination for the test.

2. The system of claim 1, wherein the runner agent is further configured to:
   retrieve the parameter combination designated for the test pipeline;
   request creation of a computing instance based at least in part on the computing instance configuration defined by the parameter combination;
   retrieve the test file from the data store; and
   execute the test on the computing instance using the one or more runner agents and the test file.

3. The system of claim 1, wherein the launcher is further configured to select the plurality of parameter combinations using a round-robin approach.

4. The system of claim 3, wherein the launcher is further configured to check the test pipelines in an order for completion of the test.

5. The system of claim 1, wherein the parameter combination in the plurality of parameter combinations identifies an image of a computing instance and a computing instance type to be used to instantiate a computing instance from the image.

6. A method of performing testing in a service provider environment, the method comprising:
   identifying a plurality of parameter combinations associated with testing virtual instance configurations, wherein the parameter combinations are stored in a first data store, and the virtual instance configurations are for virtual computing resources;
   identifying a test file for a test to be applied to the virtual instance configurations, the test file being stored in a second data store;
   defining a plurality of test pipelines in computer memory
   sending a first parameter combination from the plurality of parameter combinations to a first test pipeline in the plurality of test pipelines;
   sending a second parameter combination from the plurality of parameter combinations to a second test pipeline in the plurality of test pipelines; and
   initiating execution of the test on virtual instances in a service provider environment, the test being run using agents on the virtual instances, the test based at least in part on the test pipelines using the virtual instance configurations and the test file retrieved from the second data store, and results of the test being sent to the second data store.

7. The method of claim 6, wherein executing the test as defined in the test pipelines using the respective virtual instance configurations further comprises performing a set of actions using the agent, comprising:
   identifying the virtual instances based on the virtual instance configurations defined by the first parameter combination and the second parameter combination;
   retrieving the test file from the data store; and
   applying the test to the virtual instance using the test file.

8. The method of claim 7, further comprising identifying the plurality of parameter combinations using a round-robin approach.

9. The method of claim 6, further comprising identifying the plurality of parameter combinations using at least one of: a combinatorial expansion, a random sample, a risk-based selection process, or a pair-wise selection process.

10. The method of claim 6, further comprising identifying the plurality of parameter combinations using a parameter combination selection formula provided via a plug-in.

11. The method of claim 6, further comprising:
    checking the test pipelines in the plurality of test pipelines in order to detect a test pipeline that has completed the test;
    identifying the first test pipeline that has completed the test using a launcher;
    selecting a next parameter combination from the plurality of parameter combinations; and
    executing the test defined in the first test pipeline via the agent using the next parameter combination as the respective parameter combination.

12. The method of claim 11, further comprising selecting the next parameter combination based on at least one of a rank, a priority, or a risk level associated with the next parameter combination.

13. The method of claim 6, wherein a parameter combination in the plurality of parameter combinations identifies at least one of: an image of a virtual instance, an instance type to be used to instantiate a virtual instance from the image, a volume type, a type of disk, a geographical region, or a geographical availability zone.

14. The method of claim 6, further comprising deleting computing instances created for the test after execution of the test in the test pipeline is completed.

15. A non-transitory computer-readable medium containing instructions thereon that, when executed by one or more processors, perform the following:
- defining a plurality of test pipelines in computer memory;
- identifying a plurality of parameter combinations, wherein a first parameter combination and a second parameter combination define virtual instance configurations to be tested on a first machine virtual instance and a second virtual machine instance for virtual computing resources;
- identifying a test file in storage for a test to be applied to a first virtual instance configuration and a second virtual instance configuration;
- sending a parameter combination from the plurality of parameter combinations to each test pipeline in the plurality of test pipelines;
- executing the test defined in the test pipelines in parallel using the first virtual instance configuration and the second virtual instance configuration and using one or more agents on the first virtual machine instance and the second virtual machine instance; and
- sending results of the test to a data store.

16. The non-transitory computer-readable medium of claim 15, wherein executing the test using the respective virtual instance configuration comprises:
- identifying a virtual instance based on the virtual instance configuration defined by the respective parameter combination;
- retrieving the test file from the data store; and
- applying the test to the virtual instance using the test file.

17. The non-transitory computer-readable medium of claim 15, further comprising instructions thereon which, when executed by one or more processors, perform the following:
- identifying the plurality of parameter combinations using at least one of: a combinatorial expansion, a random sample, a risk-based selection process, or a pair-wise selection process.

18. The non-transitory computer-readable medium of claim 15, further comprising instructions thereon which, when executed by one or more processors, perform the following:
- identifying the plurality of parameter combinations using a parameter combination selection formula provided by a plug-in.

19. The non-transitory computer-readable medium of claim 15, further comprising instructions thereon which, when executed by one or more processors, perform the following:
- selecting the next parameter combination based on a rank, a priority, or a risk level associated with the next parameter combination.

20. The non-transitory computer-readable medium of claim 15, further comprising instructions thereon which, when executed by one or more processors, perform the following:
- identifying the plurality of parameter combinations using a round-robin approach.

* * * * *